United States Patent
Seki et al.

(10) Patent No.: US 8,363,677 B2
(45) Date of Patent: Jan. 29, 2013

(54) SC-FDMA TRANSMISSION DEVICE AND SC-FDMA TRANSMISSION SIGNAL FORMATION METHOD

(75) Inventors: Yuta Seki, Kanagawa (JP); Richol Ku, Kanagawa (JP)

(73) Assignee: Panasonic Corporation, Osaka (JP)

( * ) Notice: Subject to any disclaimer, the term of this patent is extended or adjusted under 35 U.S.C. 154(b) by 219 days.

(21) Appl. No.: 12/934,129

(22) PCT Filed: Feb. 6, 2009

(86) PCT No.: PCT/JP2009/000465
§ 371 (c)(1),
(2), (4) Date: Sep. 23, 2010

(87) PCT Pub. No.: WO2009/118981
PCT Pub. Date: Oct. 1, 2009

(65) Prior Publication Data
US 2011/0019697 A1    Jan. 27, 2011

(30) Foreign Application Priority Data
Mar. 26, 2008    (JP) .................................. 2008-081894

(51) Int. Cl.
*H04J 1/00*    (2006.01)
*H04J 11/00*    (2006.01)
*H04W 4/00*    (2009.01)
*H04B 7/00*    (2006.01)

(52) U.S. Cl. ........ 370/480; 370/210; 370/329; 370/344; 375/259; 375/260; 455/452.2; 455/507

(58) Field of Classification Search .................. 370/210, 370/331, 329, 344, 465–490, 537; 375/259–279, 375/295, 316, 350; 455/63.1, 296, 450, 452.2, 455/452.1, 507
See application file for complete search history.

(56) References Cited
U.S. PATENT DOCUMENTS
(Continued)

FOREIGN PATENT DOCUMENTS
JP    08-251134    9/1996
JP    2002-084254    3/2002
(Continued)

OTHER PUBLICATIONS
International Search Report dated May 19, 2009.
(Continued)

*Primary Examiner* — Afsar M. Qureshi
(74) *Attorney, Agent, or Firm* — Dickinson Wright PLLC

(57) ABSTRACT

It is possible to provide an SC-FDMA transmission device and an SC-FDMA transmission signal formation method which improve the transmission efficiency of the SC-FDMA transmission signal. The SC-FDMA transmission device (100) performs the discrete Fourier transform process on a primary modulation signal sequence formed by N primary modulation symbols to obtain a plurality of frequency components, which are respectively mapped onto different subcarriers. The obtained SC-FDMA symbol is subjected to the inverse Fourier transform process before being transmitted. A propagation path information decoding unit (155) acquires frequency selection characteristic in a propagation path to/from a reception side. A cyclic shift unit (110) and a correlation characteristic judgment unit (115) adjust the frequency response of the SC-FDMA symbol according to the frequency selection characteristic. The adjustment is performed by a result of correlation obtained by performing a correlation calculation between the propagation path frequency selection characteristic and the SC-FDMA symbol.

14 Claims, 14 Drawing Sheets

U.S. PATENT DOCUMENTS

| | | |
|---|---|---|
| 2003/0133403 A1 | 7/2003 | Castelain |
| 2003/0133404 A1 | 7/2003 | Castelain |
| 2007/0053449 A1 | 3/2007 | Adachi |
| 2008/0123617 A1* | 5/2008 | Sato ............................. 370/344 |
| 2009/0225647 A1 | 9/2009 | Matsumoto |
| 2011/0096658 A1* | 4/2011 | Yang et al. .................... 370/210 |

FOREIGN PATENT DOCUMENTS

| | | |
|---|---|---|
| JP | 2003-234719 | 8/2003 |
| JP | 2003-249911 | 9/2003 |
| JP | 2005-117581 | 4/2005 |
| JP | 2007-329539 | 12/2007 |
| JP | 2008-78944 | 4/2008 |
| WO | 2007/032491 | 3/2007 |
| WO | 2008/084777 | 7/2008 |
| WO | 2008/096408 | 8/2008 |

OTHER PUBLICATIONS

3GPP TSG RAN WG1 Meeting#52, "Frequency Hopping Pattern for PUSCH," Samsung, LGE, NEC, Qualcomm, ZTE, Erlcsson, R1-081115, Feb. 2008, pp. 1-4.

3GPP TR 25.814 V 7.1.0, "Physical layer aspects for evolved Universal Terrestrial Radio Access (UTRA) (Release 7)," Sep. 2006, pp. 1-132.

3GPP TS 36.211 V 1.2.0, "Physical Channels and Modulation (Release 8)," Jun. 2007, pp. 1-43.

* cited by examiner

SC-FDMA TRANSMISSION DEVICE AND SC-FDMA TRANSMISSION SIGNAL FORMATION METHOD

TECHNICAL FIELD

The present invention relates to an SC-FDMA transmission apparatus and SC-FDMA transmission signal forming method.

BACKGROUND ART

At present, in LTE (Long Term Evolution) standardized in 3GPP, an SC-FDMA (Single-Carrier FDMA) scheme is adopted as an uplink radio access scheme.

FIG. 1 shows the configuration of a conventional SC-FDMA transmission apparatus. The SC-FDMA transmission apparatus shown in FIG. 1 generates SC-FDMA symbols by mapping a plurality of frequency components, which are acquired by discrete Fourier transform processing of a primary modulation signal sequence comprised of N primary modulation symbols, on respective subcarriers, performs an inverse Fourier transform on the generated SC-FDMA symbols, and transmits the SC-FDMA symbols on which the inverse Fourier transform has performed.

The subcarriers provide the frequency components of the N primary modulation symbols. In this case, because of the positional relationships between the N primary modulation symbols, the frequency components may amplify or cancel each other. Therefore, as shown in FIG. 2, the power of SC-FDMA symbols is not fixed but is distributed over frequency. That is, the frequency response characteristic varies between SC-FDMA symbols. In FIG. 2, the horizontal axis represents frequency (i.e. subcarriers) and the vertical axis represents power.

Non-Patent Document 1: 3GPP TR 25.814 V7.1.0 (2006-09)

DISCLOSURE OF INVENTION

Problems to be Solved by the Invention

However, frequency selectivity is provided by multipath fading in a channel frequency response.

Consequently, there is a problem that, if SC-FDMA symbols are transmitted by radio, signals are distorted by the channel frequency response, which reduces the transmission efficiency of SC-FDMA symbols.

It is therefore an object of the present invention to provide an SC-FDMA transmission apparatus and SC-FDMA transmission signal forming method for improving the transmission efficiency of SC-FDMA transmission signals.

Means for Solving the Problem

The SC-FDMA transmission apparatus of the present invention that generates SC-FDMA symbols by mapping a plurality of frequency components, which are acquired by performing discrete Fourier transform processing of a primary modulation signal sequence comprised of N primary modulation symbols, on different subcarriers, performs inverse Fourier transform processing on generated SC-FDMA symbols, and transmits the SC-FDMA symbols on which the inverse Fourier transform processing has performed, employs a configuration having: an acquiring section that acquires frequency selectivity in a channel to a receiving side; and an adjusting section that adjusts a frequency response of the SC-FDMA symbols based on the frequency selectivity.

The SC-FDMA transmission signal forming method of the present invention for generating SC-FDMA symbols by mapping a plurality of frequency components, which are acquired by performing discrete Fourier transform processing of a primary modulation signal sequence comprised of N primary modulation symbols, on different subcarriers, performing inverse Fourier transform processing on generated SC-FDMA symbols to form an SC-FDMA transmission signal, includes the steps of: acquiring frequency selectivity in a channel to a receiving side; and adjusting a frequency response of the SC-FDMA symbols based on the frequency selectivity.

Advantages Effect of Invention

According to the present invention, it is possible to provide an SC-FDMA transmission apparatus and SC-FDMA transmission signal forming method for improving the transmission efficiency of SC-FDMA transmission signals.

BEST MODE FOR CARRYING OUT THE INVENTION

Figure 1:
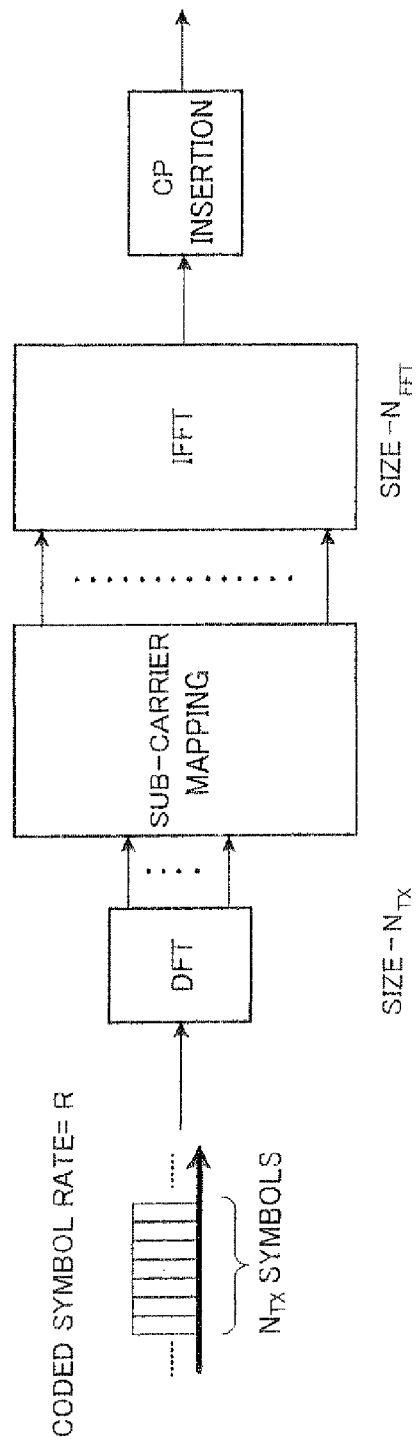
FIG. 1 is a block diagram showing the configuration of a conventional SC-FDMA transmission apparatus.
Figure 2:
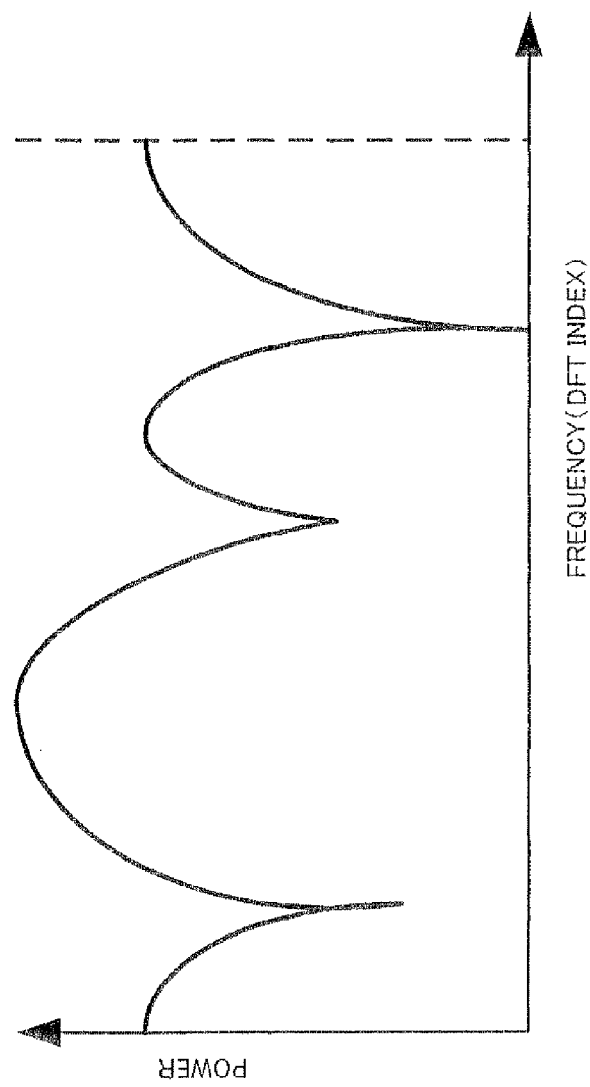
FIG. 2 illustrates an SC-FDMA transmission scheme.

Embodiments of the present invention will be explained in detail below with reference to the accompanying drawings.

Also, in the embodiments, the same components will be assigned the same reference numerals and their explanation will be omitted.

Embodiment 1

Figure 3:
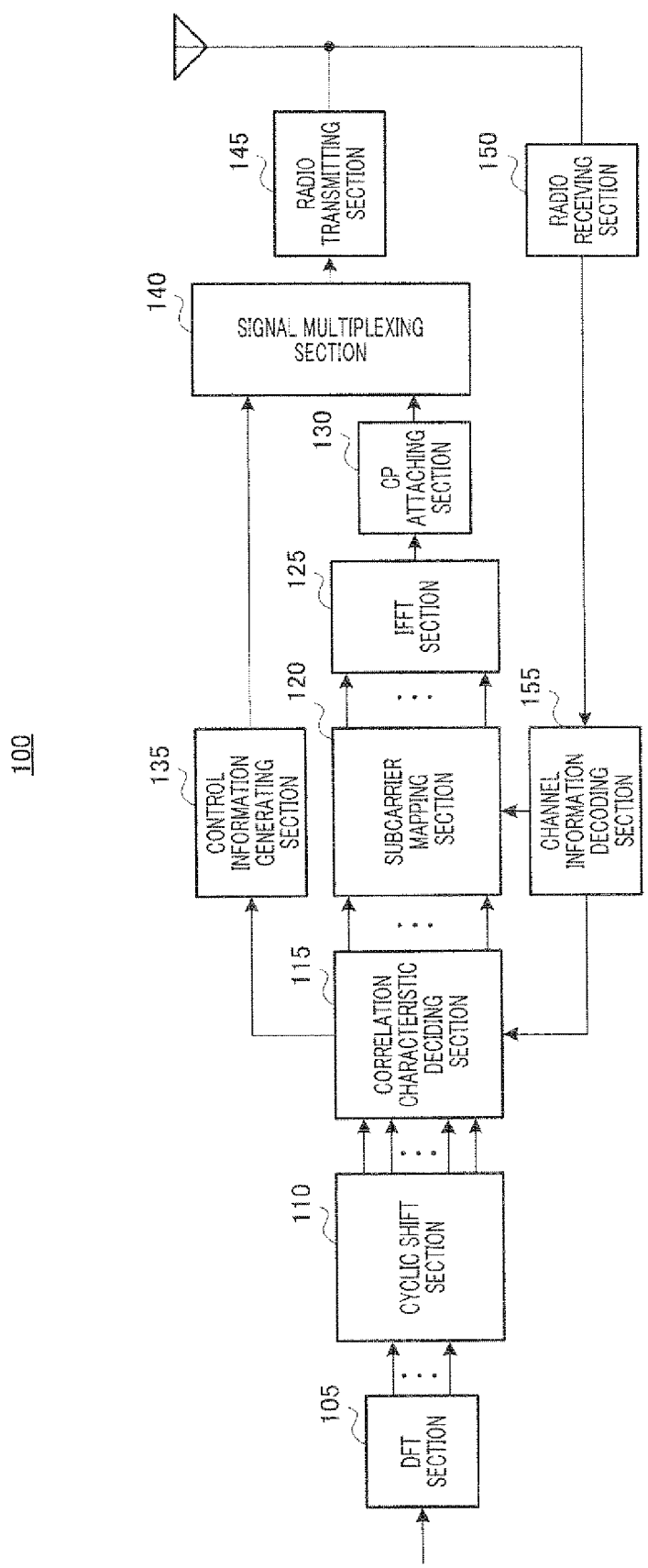
FIG. 3 is a block diagram showing the configuration of an SC-FDMA transmission apparatus according to Embodiment 1 of the present invention.

As shown in FIG. 3, SC-FDMA transmission apparatus 100 according to the present embodiment is provided with discrete Fourier transform ("DFT") section 105, cyclic shift section 110, correlation characteristic deciding section 115, subcarrier mapping section 120, inverse fast Fourier transform ("IFFT") section 125, CP attaching section 130, control information generating section 135, signal multiplexing section 140, radio transmitting section 145, radio receiving section 150 and channel information decoding section 155.

DFT section 105 receives as input a primary modulation symbol sequence, applies DFT processing to the input signal and provides a plurality of frequency components. Here, DFT section 105 performs DFT processing using $N_{TX}$ primary modulation symbols as a processing unit. The signals acquired by DFT processing are outputted to cyclic shift section 110 per processing unit.

Cyclic shift section 110 receives as input a sequence comprised of the plurality of frequency components above, and applies cyclic shift processing to the input sequence. Here, the cyclic shift processing refers to processing for moving the tail end part having a length corresponding to the amount of shifts in a sequence, to a position before the initial head position, and thereby shifting the initial head position by the amount of shifts. Cyclic shift section 110 performs cyclic shift processing of the same input sequence by a plurality of amounts of shifts. Thus, a plurality of sequences (each of which is comprised of the plurality of frequency components above) subjected to cyclic shift processing by respective amounts of shifts (i.e. shift patterns), are acquired and received as input in correlation characteristic deciding section 115.

Correlation characteristic deciding section 115 finds the correlations between the frequency responses of the sequences and the channel frequency selectivity. To be more specific, correlation characteristic deciding section 115 performs correlation calculation between the sequences and channel information received from channel information decoding section 155. Correlation characteristic deciding section 115 selects the sequence of the best correlation characteristic (i.e. the highest correlation value) in the correlation results, outputs the selected sequence to subcarrier mapping section 120 and outputs the amount of shifts applied to the selected sequence in cyclic shift section 110, to control information generating section 135.

Subcarrier mapping section 120 maps the input sequence on a predetermined frequency position (i.e. subcarrier) and outputs the resulting signal to IFFT section 125.

IFFT section 125 performs an IFFT of the input sequence and outputs the resulting signal to CP attaching section 130.

CP attaching section 130 attaches a cyclic prefix by copying the tail end of the input sequence to its head and outputs the resulting signal to signal multiplexing section 140.

Control information generating section 135 generates transmission control information from input information and outputs the transmission control information to signal multiplexing section 140. Here, the amount of shifts is included in the transmission control information and transmitted, so that, if SC-FDMA transmission apparatus 100 performs cyclic shift processing, the receiving side can perform reception processing using the transmission control information.

Signal multiplexing section 140 multiplexes the control information received from control information generating section 135 and the data information received from CP attaching section 130, and outputs a multiplex signal to radio transmitting section 145.

Radio transmitting section 145 performs predetermined radio transmission processing (such as D/A conversion and up-conversion) on the multiplex signal received from signal multiplexing section 140, and transmits the resulting radio signal via an antenna.

Radio receiving section 150 performs predetermined radio reception processing (such as down-conversion and A/D conversion) on a radio signal received via the antenna, and outputs the received signal subjected to radio reception processing to channel information decoding section 155.

Channel information decoding section 155 decodes channel information, which is included in the received signal and transmitted from the communicating party, and outputs the resulting channel information to correlation characteristic deciding section 115. Here, the channel information refers to information related to the frequency selectivity in the channel between SC-FDMA transmission apparatus 100 and the communicating party. Further, channel information decoding section 155 determines subcarrier mapping position information and outputs the subcarrier mapping position information to subcarrier mapping section 120.

The operations of SC-FDMA transmission apparatus 100 employing the above configuration will be explained.

Figure 4:
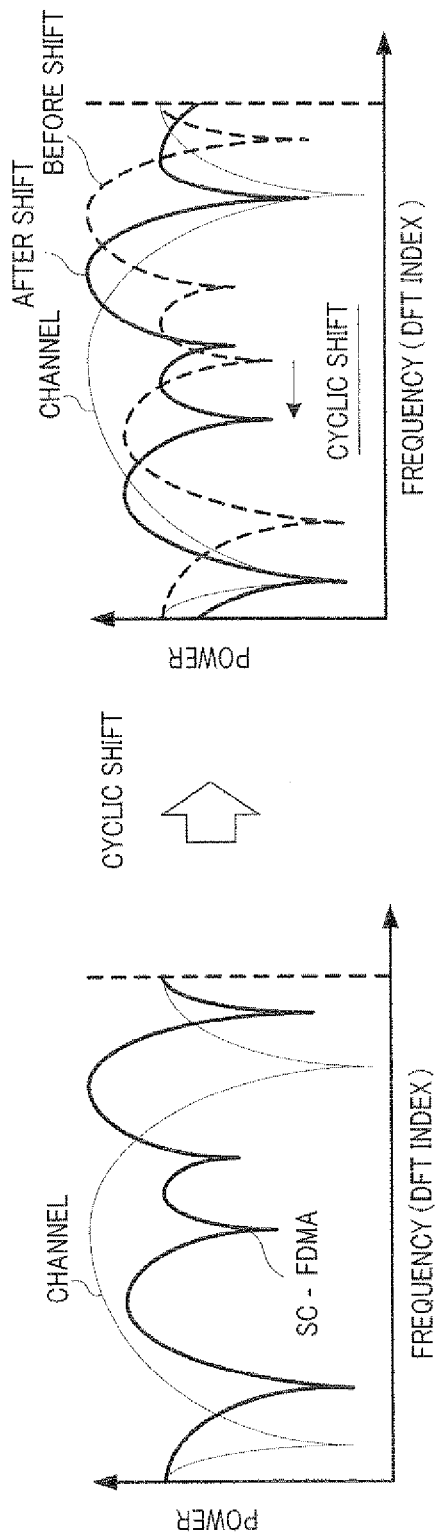
FIG. 4 illustrates the operations of the SC-FDMA transmission apparatus shown in FIG. 3.

Cyclic shift section 110 applies cyclic shift processing to an input sequence comprised of a plurality of frequency components. Here, the cyclic shift processing merely moves the tail end part of the sequence to its head, and therefore does not change the time waveform shape itself before and after the cyclic shift processing, as shown in FIG. 4.

Further, cyclic shift section 110 provides a plurality of sequences subjected to cyclic shift processing by different amounts of shifts. Also, when the number of frequency components forming a sequence is $N_{TX}$, cyclic shift section 110 may perform cyclic shift processing by all of the amounts of shifts from 1 to N−1. Alternatively, the amounts of shifts may be determined in units of coherent frequency blocks. For example, it is possible to change the amount of shifts at predetermined intervals, like 5, 10, 15, . . . , and N, and perform cyclic shift processing by the amounts of shifts. Here, $N_{TX}$ matches the number of indices of DFT. Also, in an example of performing cyclic shift at the above predetermined intervals, five indices corresponding to the predetermined interval are referred to as "resource block (RB)."

Figure 5:
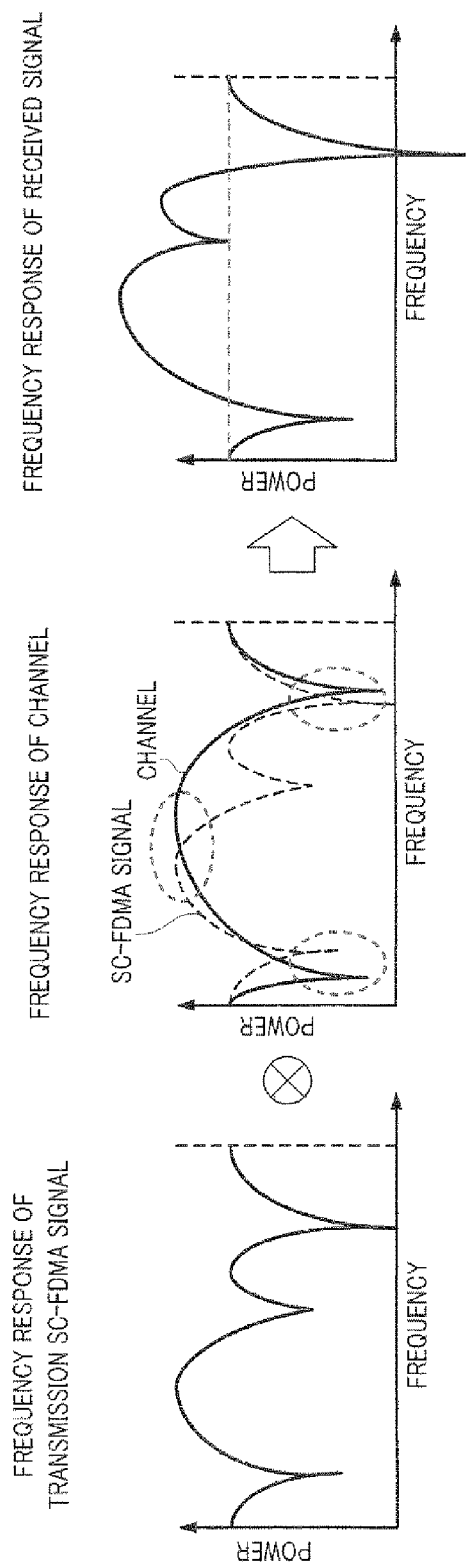
FIG. 5 illustrates processing in the correlation characteristic deciding section shown in FIG. 3.

Correlation characteristic deciding section 115 finds the correlations between the frequency responses of the sequences and the channel frequency selectivity (see FIG. 5). The channel frequency selectivity is transmitted from the communicating party as channel information. The channel frequency selectivity reported to SC-FDMA transmission apparatus 100 as that channel information is the frequency responses related to a subcarrier group allocated for communication with the communicating party. That is, frequency responses in which mapping points in IFFT section 125 of SC-FDMA transmission apparatus 100 are considered, are reported from the communicating party.

Further, correlation characteristic deciding section 115 selects the sequence of the best correlation characteristic (i.e. the highest correlation value) in the correlation results. That is, correlation characteristic deciding section 115 selects the sequence of the highest correlation between its frequency response and the channel frequency response.

The frequency response of this selected sequence shows lower power in frequencies where the channel frequency response shows lower power, and shows higher power in frequencies where the channel frequency response shows higher power. Here, while frequencies where the sequence frequency response shows lower power represent frequencies of poor communication quality, frequencies where the sequence frequency response shows higher power represent frequencies of good communication quality.

As described above, SC-FDMA transmission apparatus 100 can transmit, to the communicating party, sequences subjected to cyclic shift processing for increasing correlation with the channel frequency selectivity.

Figure 6:
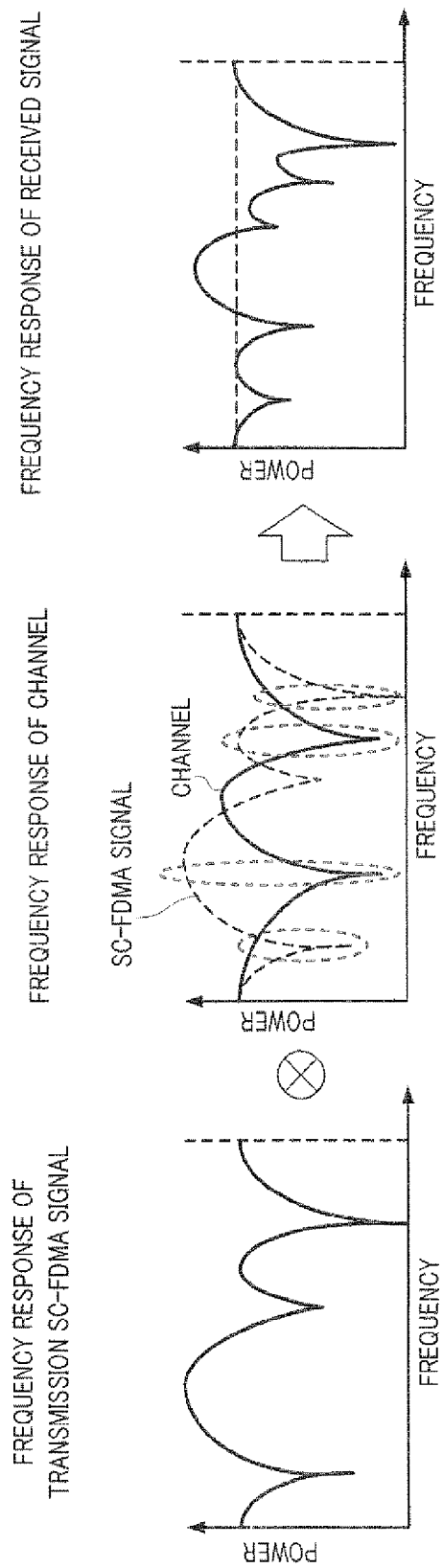
FIG. 6 illustrates processing in the correlation characteristic deciding section shown in FIG. 3.

Here, as shown in FIG. 6, if an SC-FDMA signal having a lower correlation between its frequency response and the channel frequency selectivity, the error rate of transmission data increases, that is, the communication quality degrades.

This is because, if an SC-FDMA signal having a lower correlation between its frequency response and the channel frequency selectivity is transmitted, the power in frequencies of good communication quality in the SC-FDMA transmission signal degrades due to the influence of the channel.

By contrast with this, SC-FDMA transmission apparatus 100 transmits SC-FDMA signals having higher correlations between their frequency responses and the channel frequency selectivity. By this means, it is possible to match the frequencies where power is originally set lower in SC-FDMA signals with the frequencies of poor communication quality in the channel frequency response. If the communication quality in frequencies where power is originally set lower becomes worse, there is little influence on the overall communication quality of SC-FDMA signals. The power in frequencies where the power is set higher in SC-FDMA transmission signals transmitted from SC-FDMA transmission apparatus 100, is not reduced by the influence of the channel, so that it is possible to improve the overall communication quality of SC-FDMA signals.

That is, as a result of improving the received SNR by reducing the power loss of SC-FDMA transmission signals, the transmission characteristic is improved.

Here, the correlation calculation in correlation characteristic deciding section 115 can be expressed by following equation 1.

[1]

$$C(l) = \sum_{k=0}^{K-1} \{|S(k-l)H(k)|^2\} \quad \text{(Equation 1)}$$

Here, C(1) represents the correlation result. S represents the frequency response of SC-FDMA signals and H represents channel information. Also, 1 represents the amount of shifts and S(k−1) represents the frequency response after cyclic shift. Power correlation is expressed by equation 1.

Also, in the case of complex correlation, the correlation calculation in correlation characteristic deciding section 115 can be expressed by following equation 2.

[2]

$$C(l) = \left| \sum_{k=0}^{K-1} S(k-l)H(k) \right|^2 \quad \text{(Equation 2)}$$

Also, on the receiving side of SC-FDMA signals, if channel equalization processing is performed, H' is used instead of H. The relationship between H' and H is H'(k)=H(k)W(k).

Here, W(k) represents the tap coefficients of a decoder on the receiving side. In this case, channel information includes an equalization channel.

Thus, according to the present embodiment, in SC-FDMA transmission apparatus 100 that maps a plurality of frequency components, which are acquired by performing DFT processing of a primary modulation signal sequence comprised of N primary modulation symbols, on respective subcarriers, that performs IFFT processing of the resulting SC-FDMA symbols and that transmits the results, channel information decoding section 155 acquires the frequency selectivity in the channel to the receiving side, and cyclic shift section 110 and characteristic deciding section 115 adjust the frequency response of the SC-FDMA symbols based on that frequency selectivity.

This adjustment is performed by performing correlation calculation between the channel frequency selectivity and the frequency response of SC-FDMA symbols, that is, based on the correlation result. To be more specific, this adjustment requires a correlation result acquired by correlation calculation between a plurality of frequency components after cyclic shift and the channel frequency selectivity.

In this way, by increasing the correlation between the channel frequency selectivity and the frequency response of SC-FDMA symbols, it is possible to reduce the power loss of SC-FDMA transmission signals due to the influence of the channel. By this means, the received SNR improves, so that the transmission efficiency improves.

Embodiment 2

In Embodiment 2, a cyclic shift section outputs sequences subjected to cyclic shift processing to a correlation characteristic deciding section, based on a command signal from the correlation characteristic deciding section.

Figure 7:
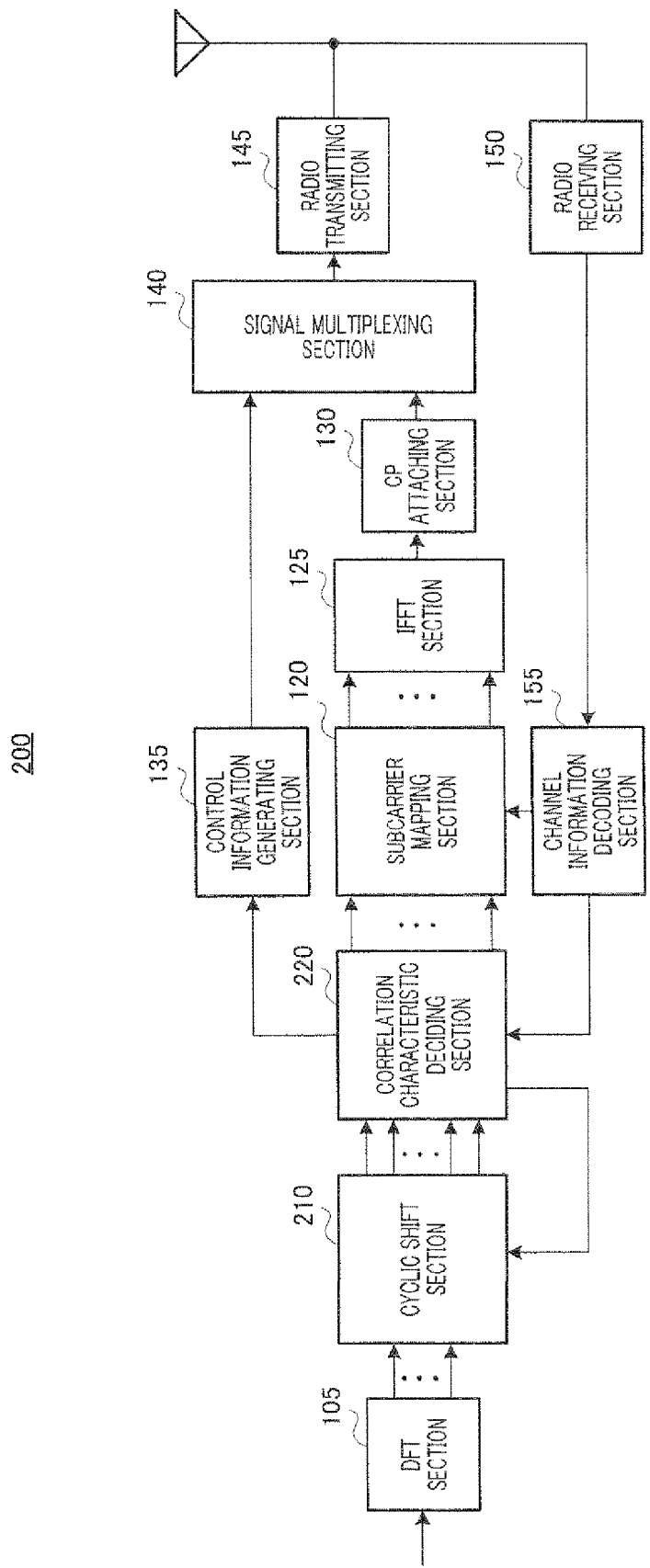
FIG. 7 is a block diagram showing the configuration of an SC-FDMA transmission apparatus according to Embodiment 2 of the present invention.

As shown in FIG. 7, SC-FDMA transmission apparatus 200 according to Embodiment 2 includes cyclic shift section 210 and correlation characteristic deciding section 220.

Correlation characteristic deciding section 220 performs correlation calculation between sequences received from cyclic shift section 210 and channel information received from channel information decoding section 155. Correlation characteristic deciding section 220 compares the correlation result and a predetermined threshold. If the correlation result is equal to or greater than the predetermined threshold, correlation characteristic deciding section 220 decides that there is correlation equal to or greater than a certain level, and outputs the sequence at that time to a subsequent processing section. If the correlation result is less than the predetermined threshold, correlation characteristic deciding section 220 outputs an output command signal of a sequence having a different amount of shifts from the current sequence, to cyclic shift section 210.

Upon receiving the output command signal from correlation characteristic deciding section 220, cyclic shift section 210 applies a cyclic shift to the sequence by the changed amount of shifts and outputs the resulting sequence to correlation characteristic deciding section 220.

Thus, according to the present embodiment, in SC-FDMA transmission apparatus 200, cyclic shift section 210 sequentially changes the amount of shifts according to a command signal from correlation characteristic deciding section 220 and performs a cyclic shift of sequences by the amounts of shifts, and correlation characteristic deciding section 220 selects a sequence subjected to cyclic shift which has a correlation result equal to or greater than a predetermined level, and outputs the selected sequence to subcarrier mapping section 120.

By this means, it is possible to reduce the number of parallel processings in correlation characteristic deciding section 220 and cyclic shift section 210, so that it is possible to reduce the circuit scale of SC-FDMA transmission apparatus 200.

Embodiment 3

In Embodiment 2, a cyclic shift is applied to frequency domain signals to adjust the frequency response of SC-FDMA transmission signals. Here, cyclic shift processing on the frequency axis is equivalent to phase rotation processing on the time axis. Therefore, in Embodiment 3, phase rotation processing is applied to a primary modulation signal sequence representing time domain signals to adjust the frequency response of SC-FDMA transmission signals.

Figure 8:
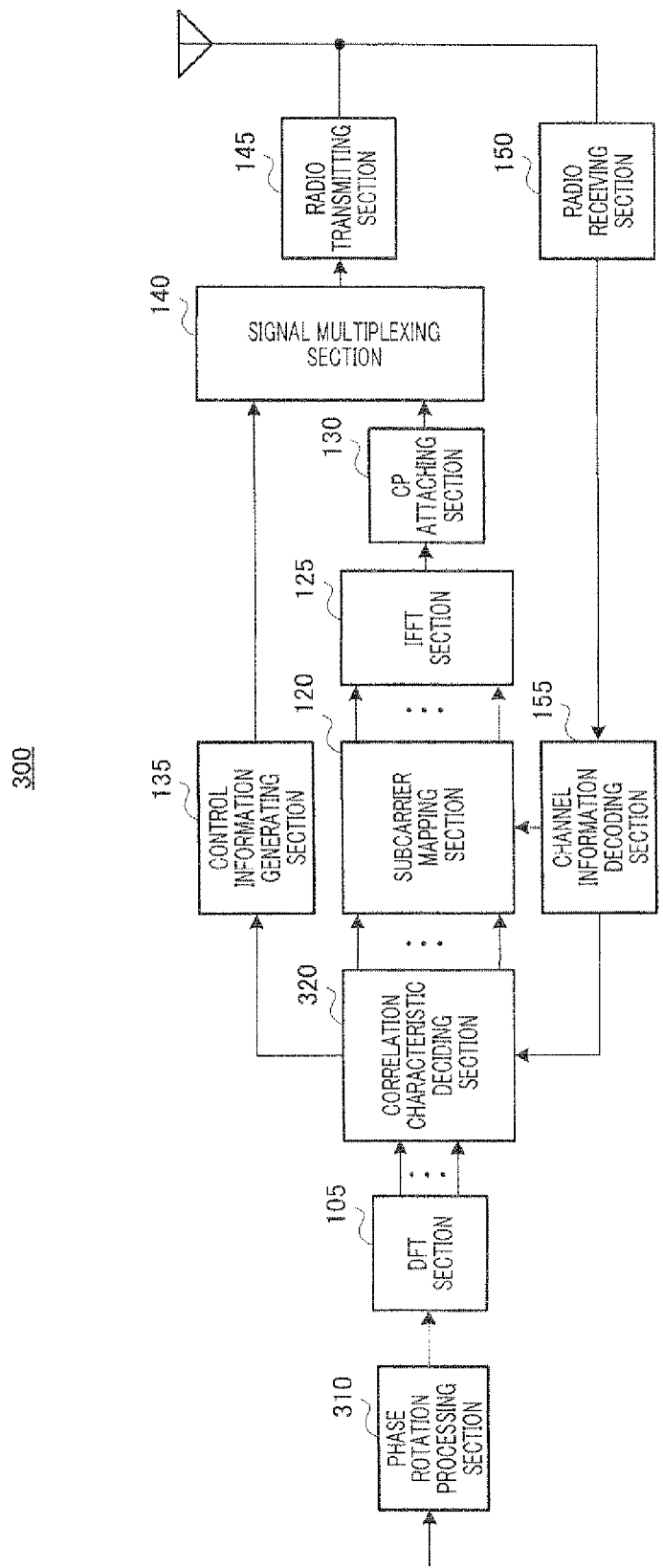
FIG. 8 is a block diagram showing the configuration of an SC-FDMA transmission apparatus according to Embodiment 3 of the present invention.

As shown in FIG. 8, SC-FDMA transmission apparatus 300 according to Embodiment 3 includes phase rotation processing section 310 and correlation characteristic deciding section 320.

Phase rotation processing section 310 receives as input a primary modulation symbol sequence and applies phase rotation processing to the input sequence. Here, sequences before and after phase rotation processing have the same amplitude and different phases. Phase rotation processing section 310 performs phase rotation processing of the same input sequence by a plurality of amounts of phase rotation. Thus, a plurality of primary modulation symbol sequences subjected to phase rotation processing by different amounts of phase rotation (i.e. phase rotation patterns), are acquired and received as input in DFT section 105. DFT section 105 performs DFT processing of each of the plurality of primary modulation symbols acquired in phase rotation processing section 310.

Correlation characteristic deciding section 320 finds correlation between the frequency responses of the sequences and the channel frequency selectivity. To be more specific, correlation characteristic deciding section 320 performs correlation calculation between the sequences and channel information received from channel information decoding section 155. Correlation characteristic deciding section 320 selects the sequence of the best correlation characteristic (i.e. the highest correlation value) in the correlation results, outputs the selected sequence to subcarrier mapping section 120 and outputs the amount of moved rotation applied to the selected sequence in phase rotation processing section 310, to control information generating section 135.

Also, in SC-FDMA transmission apparatus 300, like Embodiment 2, correlation characteristic deciding section 320 can output a command signal to phase rotation processing section 310 such that phase rotation processing section 310 changes the amount of phase rotation according to the command signal and outputs the resulting sequence to DFT section 105.

Embodiment 4

In Embodiment 4, the frequency response of SC-FDMA transmission signals is adjusted using scrambling codes.

Figure 9:
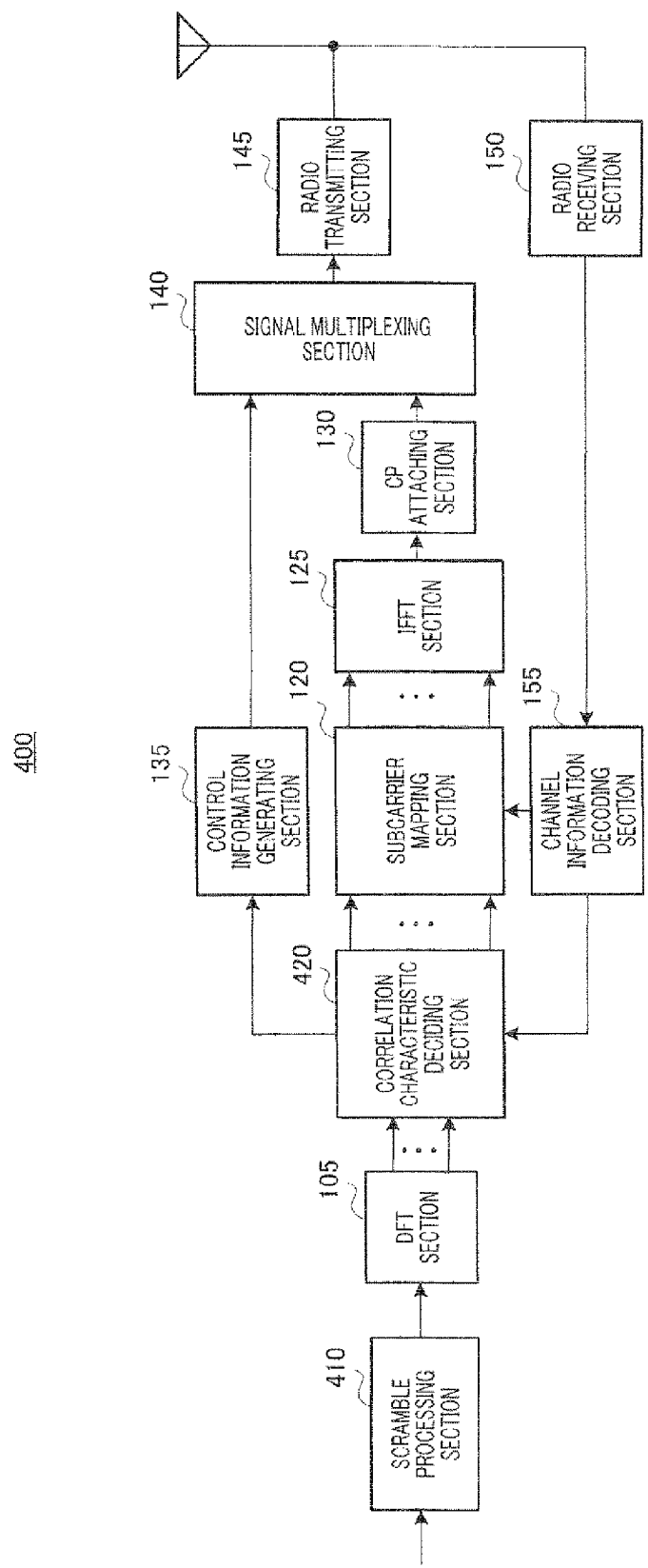
FIG. 9 is a block diagram showing the configuration of an SC-FDMA transmission apparatus according to Embodiment 4 of the present invention.

As shown in FIG. 9, SC-FDMA transmission apparatus 400 according to Embodiment 4 includes scramble processing section 410 and correlation characteristic deciding section 420.

Figure 10:
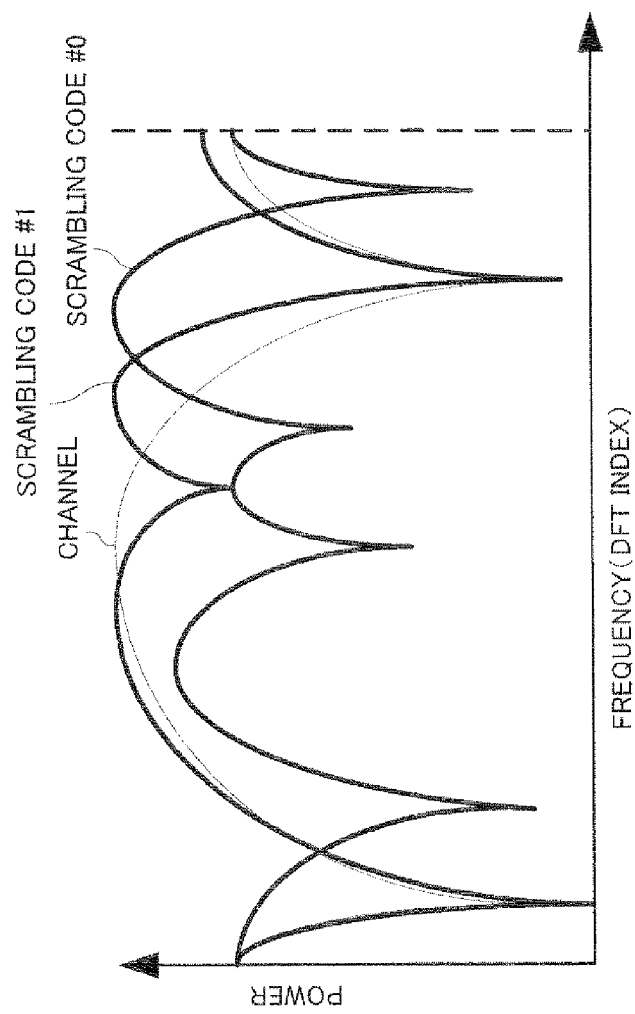
FIG. 10 illustrates frequency response adjustment of SC-FDMA transmission signals in the SC-FDMA transmission apparatus shown in FIG. 9.

Scramble processing section 410 receives as input a primary modulation symbol sequence and applies scrambling processing to the input sequence. Here, as shown in FIG. 10, sequences before and after scrambling processing have different frequency responses. Scramble processing section 410 performs scrambling processing of the same input sequence by a plurality of scrambling codes. Thus, a plurality of primary modulation symbol sequences subjected to scrambling processing by different scrambling codes are acquired and received as input in DFT section 105. DFT section 105 performs DFT processing of each of the plurality of primary modulation symbols acquired in scramble processing section 410.

Correlation characteristic deciding section 420 finds correlations between the frequency responses of the sequences and the channel frequency selectivity. To be more specific, correlation characteristic deciding section 420 performs correlation calculation between the sequences and channel information received from channel information decoding section 155. Correlation characteristic deciding section 420 selects the sequence of the best correlation characteristic (i.e. the highest correlation value) in the correlation results, outputs the selected sequence to subcarrier mapping section 120 and outputs identification information of a scrambling code used to scramble the selected sequence in scramble processing section 410, to control information generating section 135.

Here, the correlation calculation in correlation characteristic deciding section 420 can be expressed by following equation 3.

[3]

$$C = \sum_{k=0}^{K-1} \{|S(k)H(k)|^2\} \quad \text{(Equation 3)}$$

Here, C represents the correlation result. S represents the frequency response of SC-FDMA signals, and H represents channel information. Correlation characteristic deciding section 420 selects S(k) (i.e. scrambled sequence) to maximize C.

Thus, according to the present embodiment, in SC-FDMA transmission apparatus 400, scramble processing section 410 provided in an input stage of DFT processing scrambles N primary modulation symbols by scrambling codes, and correlation characteristic deciding section 420 performs correlation calculation between the frequency selectivity and a plurality of frequency components acquired by performing DFT processing of the N primary modulation symbols scrambled, and adjusts the frequency response of SC-FDMA transmission signals based on the correlation result.

Embodiment 5

In Embodiment 5, like Embodiment 2, a correlation characteristic deciding section outputs a command signal to a scramble processing section, and the scramble processing section changes the scrambling code according to the command signal and outputs the resulting sequence to a DFT section.

Figure 11:
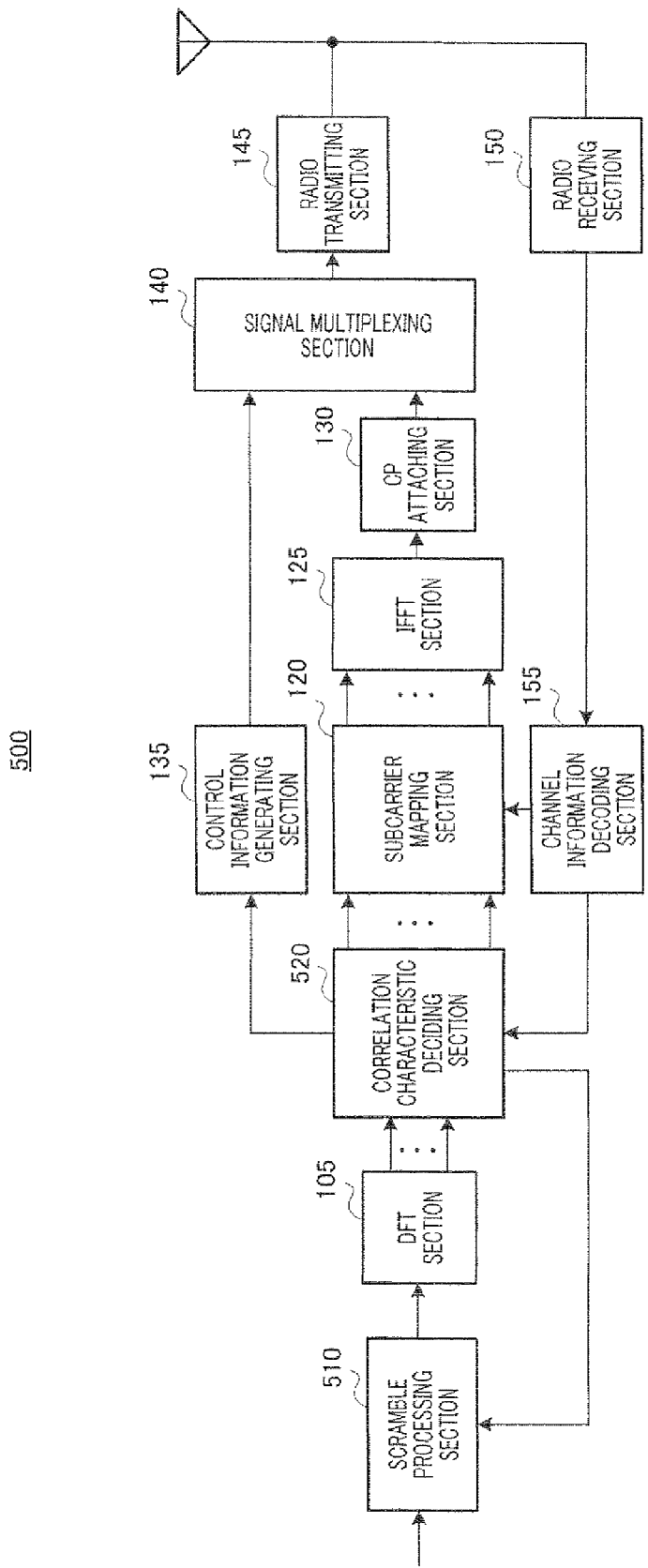
FIG. 11 is a block diagram showing the configuration of an SC-FDMA transmission apparatus according to Embodiment 5 of the present invention.

As shown in FIG. 11, SC-FDMA transmission apparatus 500 according to Embodiment 5 includes scramble processing section 510 and correlation characteristic deciding section 520.

Correlation characteristic deciding section 520 performs a correlation calculation between a sequence received from scramble processing section 510 and channel information received from channel information decoding section 155.

Correlation characteristic deciding section 520 compares the correlation result and a predetermined threshold. If the correlation result is equal to or greater than the predetermined threshold, correlation characteristic deciding section 520 decides that there is correlation equal to or greater than a certain level, and outputs the sequence at that time to a subsequent processing section. If the correlation result is less than the predetermined threshold, correlation characteristic deciding section 520 outputs an output command signal of a sequence having a different amount of shifts from the current sequence, to scramble processing section 510.

Upon receiving the output command signal from correlation characteristic deciding section 220, scramble processing section 510 scrambles a sequence by a changed scrambling code and outputs the resulting sequence to correlation characteristic deciding section 520.

Thus, according to the present embodiment, in SC-FDMA transmission apparatus 500, scramble processing section 510 sequentially changes a scrambling code according to a command signal from correlation characteristic deciding section 520 and scrambles N primary modulation symbols by the scrambling codes, and correlation characteristic deciding section 520 selects a plurality of frequency components which have a correlation result equal to or greater than a predetermined level, and outputs the selected components for mapping processing.

By this means, it is possible to reduce the average processing amount in correlation characteristic deciding section 520 and scramble processing section 510, so that it is possible to reduce the power consumption in SC-FDMA transmission apparatus 500.

Embodiment 6

In Embodiment 6, SC-FDMA transmission signals as time domain signals are subjected to convolutional calculation and scrambled at the same time to adjust the frequency response of SC-TDMA transmission signals.

Figure 12:
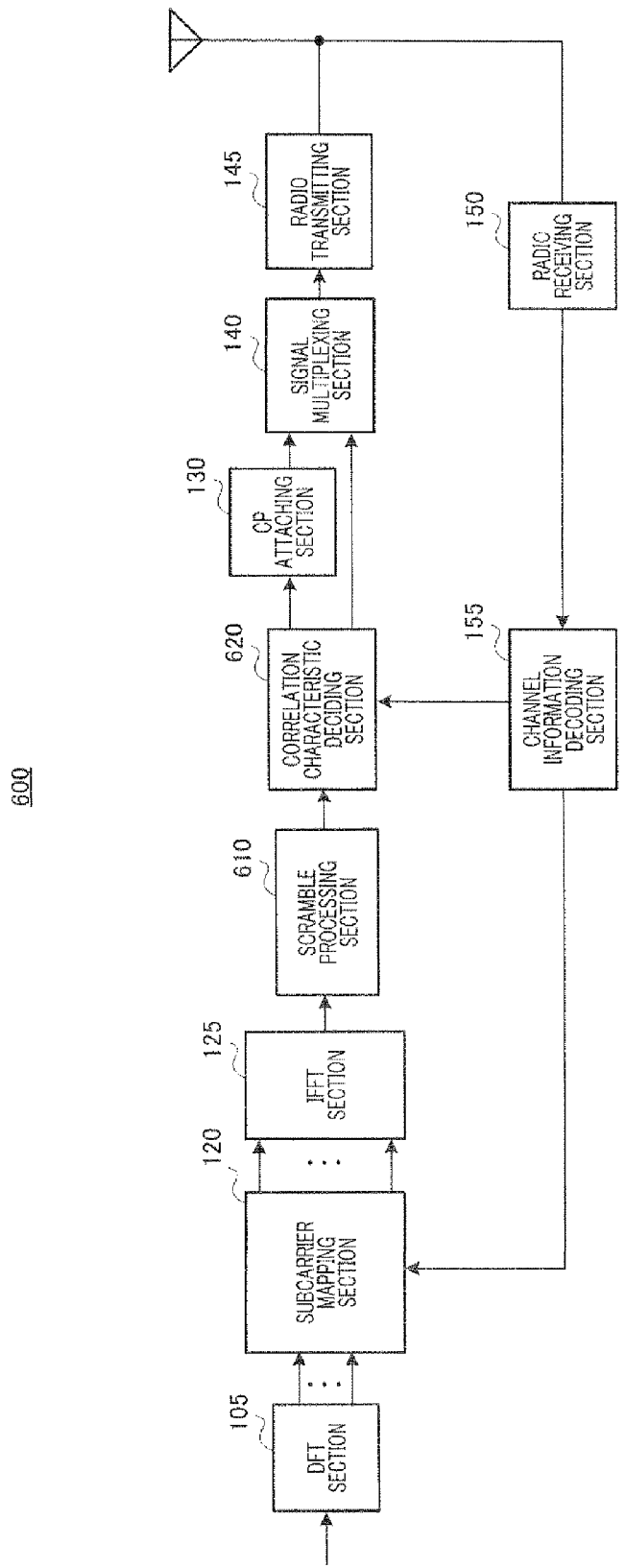
FIG. 12 is a block diagram showing the configuration of an SC-FDMA transmission apparatus according to Embodiment 6 of the present invention.

As shown in FIG. 12, SC-FDMA transmission apparatus 600 according to Embodiment 6 includes scramble processing section 610 and characteristic correlation deciding section 620.

Scramble processing section 610 receives as input SC-FDMA transmission signals without CP's, and applies scrambling processing to the input sequence. To be more specific, scramble processing section 610 performs convolution calculation and scrambling processing on the same input sequence using a plurality of scrambling codes. The resulting plurality of SC-FDMA transmission signals are outputted to correlation characteristic deciding section 620.

Correlation characteristic deciding section 620 finds correlations between the frequency response of the SC-FDMA transmission signals and the channel frequency selectivity. To be more specific, correlation characteristic deciding section 620 performs correlation calculation between the SC-FDMA transmission signals and channel information received from channel information decoding section 155. Correlation characteristic deciding section 620 selects the SC-FDMA transmission signal of the best correlation characteristic (i.e. the highest correlation value) in the correlation results, outputs the selected SC-FDMA transmission signal and identification information of the scrambling code used to scramble the selected SC-FDMA transmission signal in scramble processing section 610, to signal multiplexing section 140. Also, the selected SC-FDMA transmission signal is attached a CP in CP attaching section 130 and received as input in signal multiplexing section 140.

Here, the correlation calculation in correlation characteristic deciding section 620 can be expressed by following equation 4.

[4]

$$c = \sum_{n=0}^{N-1} \left| \sum_{m=0}^{M-1} s(n-m)h(n) \right|^2 \quad \text{(Equation 4)}$$

Here, C represents the correlation result. Further, s represents the frequency response of an SC-FDMA signal and h represents channel information. Correlation characteristic deciding section 620 selects s(n) (i.e. scrambling sequence) to maximize c.

Thus, according to the present embodiment, in SC-FDMA transmission apparatus 600, scramble processing section 610 provided in an output stage of IFFT section 125 scrambles SC-FDMA symbols using scrambling codes, performs correlation calculation between the scrambled SC-FDMA symbols and the channel frequency selectivity, and adjusts the frequency response of SC-FDMA transmission signals based on the correlation result.

By this means, DFT processing needs not be performed several times, so that it is possible to reduce the power consumption of SC-FDMA transmission apparatus 600.

Embodiment 7

In Embodiment 7, the frequency response of SC-FDMA transmission signals is adjusted by changing an interleaving pattern.

Figure 13:
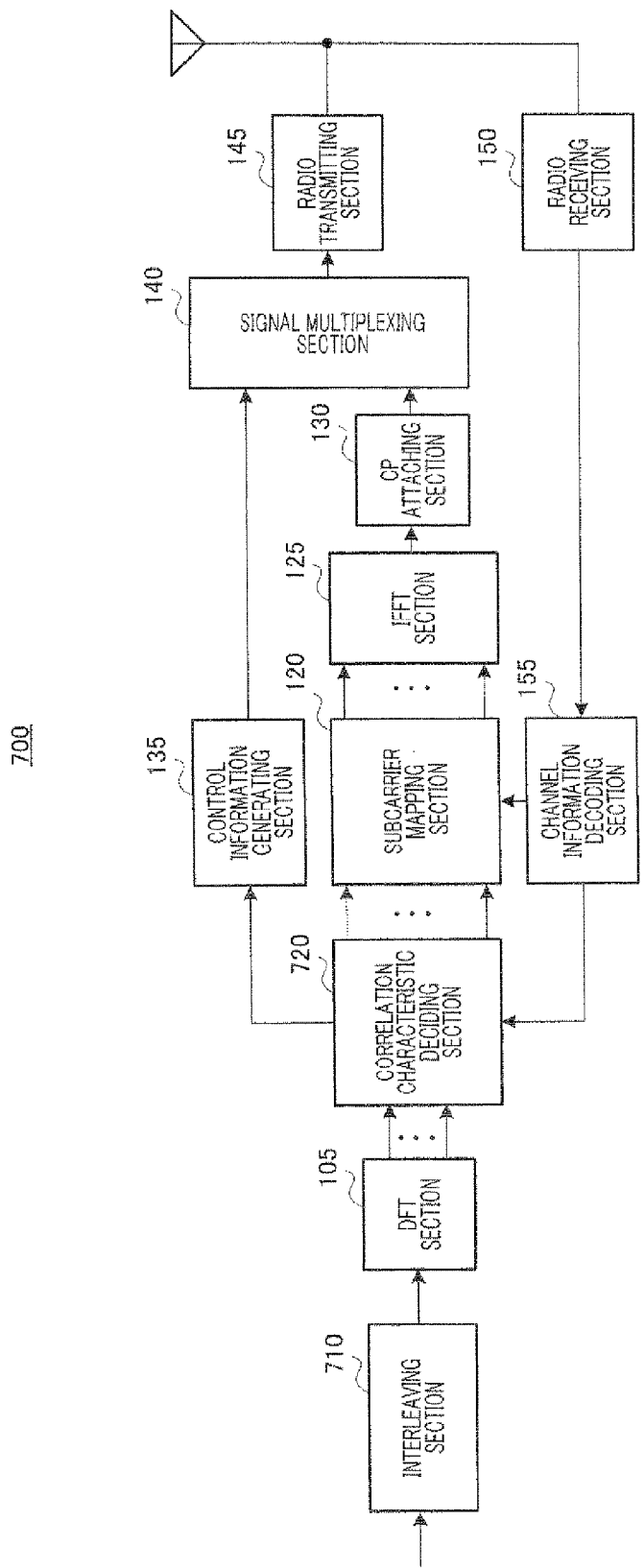
FIG. 13 is a block diagram showing the configuration of an SC-FDMA transmission apparatus according to Embodiment 7 of the present invention.

As shown in FIG. 13, SC-FDMA transmission apparatus 700 according to Embodiment 7 includes interleaving processing section 710 and correlation characteristic deciding section 720.

Figure 14:
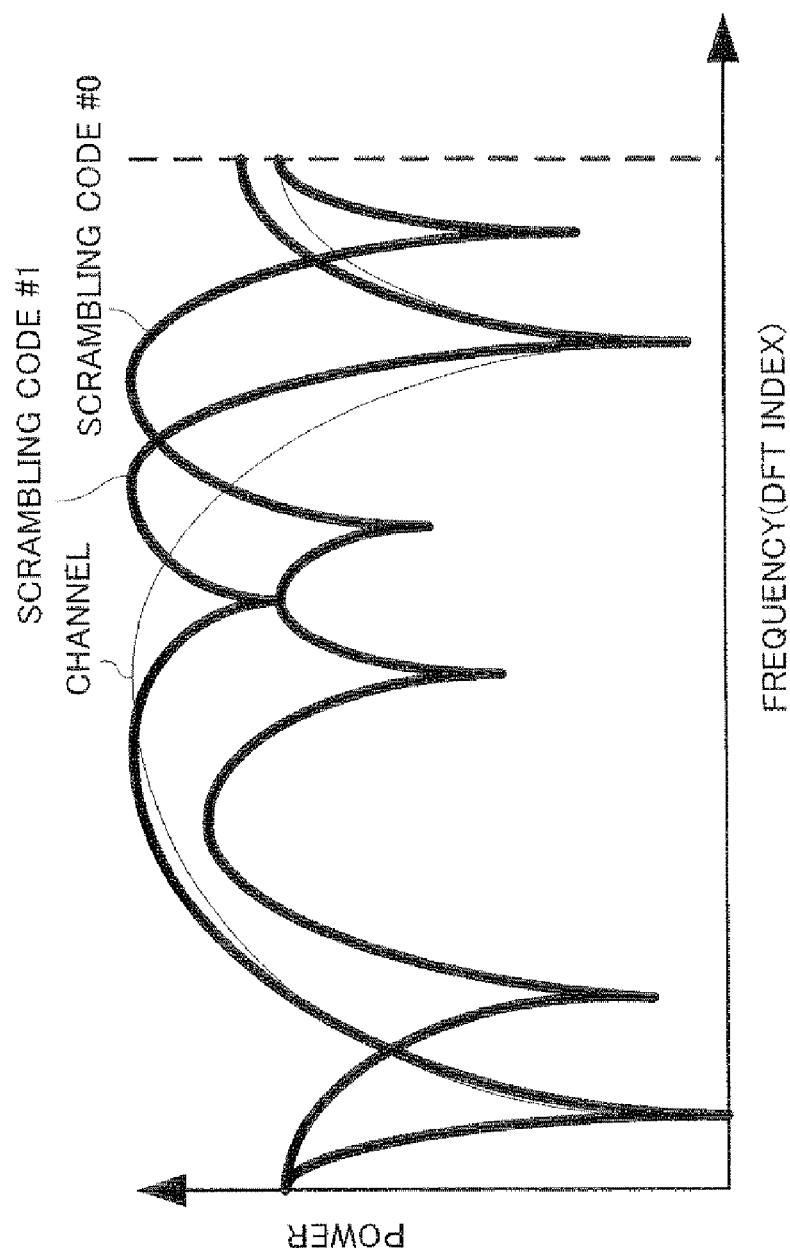
FIG. 14 illustrates frequency response adjustment of SC-FDMA transmission signals in the SC-FDMA transmission apparatus shown in FIG. 13.

Interleaving processing section 710 receives as input a primary modulation symbol sequence and applies interleaving processing to the input sequence. As shown in FIG. 14, the frequency response varies between sequences before and after interleaving processing. Interleaving processing section 710 performs interleaving processing of the same input sequence using a plurality of interleaving patterns. Thus, a plurality of primary modulation symbol sequences subjected to interleaving processing by different interleaving patterns, are acquired and received as input in DFT section 105. DFT section 105 performs DFT processing of the resulting plurality of primary modulation symbols acquired in interleaving processing section 710.

Correlation characteristic deciding section 720 finds correlations between the frequency responses of the sequences and the channel frequency selectivity. To be more specific, correlation characteristic deciding section 720 performs correlation calculation between the sequences and channel information received from channel information decoding section 155. Correlation characteristic deciding section 720 selects the sequence of the best correlation characteristic (i.e. the highest correlation value) in the correlation results, outputs the selected sequence to subcarrier mapping section 120 and outputs identification information of the interleaving pattern used to interleave the selected sequence in interleaving processing section 710, to control information generating section 135.

Thus, according to the present embodiment, in SC-FDMA transmission apparatus 700, interleaving processing section 710 provided in an input stage of DFT processing interleaves N primary modulation symbols by interleaving patterns, and correlation characteristic deciding section 720 performs correlation calculation between a plurality of frequency components acquired by performing DFT processing of the N primary modulation symbols interleaved and the frequency selectivity, and adjusts the frequency response of SC-FDMA transmission signals based on the correlation result.

By this means, when retransmission control is applied to the system comprised of SC-FDMA transmission apparatus 700 and the communicating party, it is estimated to select a varying interleaving pattern every retransmission. Therefore, it is possible to improve the retransmission gain.

Also, interleaving processing section 710 and correlation characteristic deciding section 720 may be provided in an output stage of IFFT section 125. In this case, similar to Embodiment 6, SC-FDMA transmission signals, which are time-domain signals, are subjected to convolution calculation and interleaving to adjust the frequency response of the SC-FDMA transmission signals.

The disclosure of Japanese Patent Application No. 2008-081894, filed on Mar. 26, 2008, including the specification, drawings and abstract, is incorporated herein by reference in its entirety.

INDUSTRIAL APPLICABILITY

The SC-FDMA transmission apparatus and SC-FDMA transmission signal forming method according to the present invention are effective to improve the transmission efficiency of SC-FDMA transmission signals.

The invention claimed is:

1. An SC-FDMA (Single-Carrier Frequency Division Multiple Access) transmission apparatus that generates SC-FDMA symbols by mapping a plurality of frequency components, which are acquired by performing discrete Fourier transform processing of a primary modulation signal sequence comprised of N primary modulation symbols, on different subcarriers, performs inverse Fourier transform processing on the generated SC-FDMA symbols, and transmits the SC-FDMA symbols on which the inverse Fourier transform processing has performed, comprising:
   an acquiring section that acquires frequency selectivity in a channel to a receiving side; and
   an adjusting section that adjusts a frequency response of the SC-FDMA symbols based on the frequency selectivity.

2. The SC-FDMA transmission apparatus according to claim 1, wherein the adjusting section performs a correlation calculation between the frequency selectivity and the frequency response of the SC-FDMA symbols, and adjusts the frequency response of the SC-FDMA symbols based on the correlation result.

3. The SC-FDMA transmission apparatus according to claim 1, wherein the adjusting section further includes a cyclic shift section that performs a cyclic shift of the plurality of frequency components, and the adjusting section performs a correlation calculation between the plurality of frequency components after the cyclic shift and the frequency selectivity, and uses the correlation result as a correlation result between the frequency selectivity and the frequency response of the SC-FDMA symbols.

4. The SC-FDMA transmission apparatus according to claim 3, wherein:
   the cyclic shift section sequentially changes an amount of shifts and performs the cyclic shift of the plurality of frequency components by amounts of shifts; and
   the adjusting section selects the plurality of frequency components after the cyclic shift which have the correlation result equal to or greater than a predetermined level, and outputs the plurality of frequency components selected, to mapping processing.

5. The SC-FDMA transmission apparatus according to claim 1, wherein the adjusting section includes a phase rotation processing section, which applies phase rotation processing to the N primary modulation symbols and which is provided in an input stage of the discrete Fourier transform processing, performs a correlation calculation between the frequency selectivity and a plurality of frequency components acquired by performing discrete Fourier transform processing of the N primary modulation symbols after the phase rotation processing, and uses the correlation result as a correlation result between the frequency selectivity and the frequency response of the SC-FDMA symbols.

6. The SC-FDMA transmission apparatus according to claim 5, wherein:
   the phase rotation processing section sequentially changes an amount of phase rotation and applies phase rotation processing to the N primary modulation symbols by amounts of phase rotation; and
   the adjusting section selects the plurality of frequency components with the correlation result equal to or greater than a predetermined level, and outputs the plurality of frequency components selected, to mapping processing.

7. The SC-FDMA transmission apparatus according to claim 1, wherein the adjusting section includes a scrambling section, which scrambles the N primary modulation symbols by scrambling codes and which is provided in an input stage of the discrete Fourier transform processing, performs a correlation calculation between the frequency selectivity and a plurality of frequency components acquired by performing discrete Fourier transform processing of the N primary modulation symbols scrambled, and uses the correlation result as a correlation result between the frequency selectivity and the frequency response of the SC-FDMA symbols.

8. The SC-FDMA transmission apparatus according to claim 7, wherein:
   the scrambling section sequentially changes the scrambling code and scrambles the N primary modulation symbols by the scrambling codes; and
   the adjusting section selects the plurality of frequency components which have the correlation result equal to or greater than a predetermined level, and outputs the plurality of frequency components selected, to mapping processing.

9. The SC-FDMA transmission apparatus according to claim 1, wherein the adjusting section includes a scrambling section, which scrambles the SC-FDMA symbols by scrambling codes and which is provided in an input stage of the inverse Fourier transform processing, performs a correlation calculation between the scrambled SC-FDMA symbols and the frequency selectivity, and uses the correlation result as a correlation result between the frequency selectivity and the frequency response of the SC-FDMA symbols.

10. The SC-FDMA transmission apparatus according to claim 1, wherein the adjusting section includes an interleaver, which interleaves the N primary modulation symbols by interleaving patterns and which is provided in an input stage of the discrete Fourier transform processing, performs a correlation calculation between the frequency selectivity and a plurality of frequency components acquired by performing discrete Fourier transform processing of the N primary modulation symbols interleaved, and uses the correlation result as a correlation result between the frequency selectivity and the frequency response of the SC-FDMA symbols.

11. The SC-FDMA transmission apparatus according to claim 10, wherein:
the interleaver sequentially changes the interleaving pattern and scrambles the N primary modulation symbols by the interleaving patterns;
the adjusting section selects the plurality of frequency components which have the correlation result equal to or greater than a predetermined level, and outputs the plurality of frequency components selected, to mapping processing.

12. The SC-FDMA transmission apparatus according to claim 2, wherein the correlation between the frequency selectivity and the SC-FDMA symbols is a power correlation.

13. The SC-FDMA transmission apparatus according to claim 2, wherein the correlation between the frequency selectivity and the SC-FDMA symbols is a complex correlation.

14. An SC-FDMA (Single-Carrier Frequency Division Multiple Access) transmission method for generating SC-FDMA symbols by mapping a plurality of frequency components, which are acquired by performing discrete Fourier transform processing of a primary modulation signal sequence comprised of N primary modulation symbols, on different subcarriers, performing inverse Fourier transform processing on the generated SC-FDMA symbols to form an SC-FDMA transmission signal, the method comprising the steps of:
acquiring frequency selectivity in a channel to a receiving side; and
adjusting a frequency response of the SC-FDMA symbols based on the frequency selectivity.

* * * * *